United States Patent
Singh

(10) Patent No.: US 8,593,788 B2
(45) Date of Patent: Nov. 26, 2013

(54) SUPERCAPACITORS WITH BLOCK COPOLYMER ELECTROLYTES

(75) Inventor: Mohit Singh, Berkeley, CA (US)

(73) Assignee: Seeo, Inc, Hayward, CA (US)

( * ) Notice: Subject to any disclaimer, the term of this patent is extended or adjusted under 35 U.S.C. 154(b) by 176 days.

(21) Appl. No.: 12/996,383

(22) PCT Filed: May 29, 2009

(86) PCT No.: PCT/US2009/045748
§ 371 (c)(1),
(2), (4) Date: Dec. 3, 2010

(87) PCT Pub. No.: WO2009/148977
PCT Pub. Date: Dec. 10, 2009

(65) Prior Publication Data
US 2011/0075324 A1   Mar. 31, 2011

Related U.S. Application Data

(60) Provisional application No. 61/058,889, filed on Jun. 4, 2008.

(51) Int. Cl.
*H01G 9/00* (2006.01)
*H01M 6/04* (2006.01)

(52) U.S. Cl.
USPC .......... 361/502; 361/503; 361/504; 361/508; 361/523; 361/528

(58) Field of Classification Search
USPC .......... 361/502–505, 511, 516, 523, 525, 527
See application file for complete search history.

(56) References Cited

U.S. PATENT DOCUMENTS

| | | | | |
|---|---|---|---|---|
| 5,079,674 A | * | 1/1992 | Malaspina | 361/502 |
| 5,523,180 A | * | 6/1996 | Armand et al. | 429/188 |
| 5,786,555 A | * | 7/1998 | Saito et al. | 204/294 |
| 7,057,881 B2 | | 6/2006 | Chow | |
| 7,061,749 B2 | | 6/2006 | Liu | |
| 7,087,348 B2 | | 8/2006 | Holman | |
| 7,285,360 B2 | | 10/2007 | Maruyama | |
| 7,286,334 B2 | | 10/2007 | Nakamura | |
| 7,397,650 B2 | | 7/2008 | Sato | |
| 2004/0214090 A1 | * | 10/2004 | West et al. | 429/311 |
| 2006/0270822 A1 | | 11/2006 | Norsten | |
| 2008/0045615 A1 | | 2/2008 | Best | |
| 2008/0316678 A1 | * | 12/2008 | Ehrenberg et al. | 361/503 |
| 2009/0273882 A1 | | 11/2009 | Park | |

FOREIGN PATENT DOCUMENTS

WO   2008/016990   2/2008

* cited by examiner

Primary Examiner — Jayprakash N Gandhi
Assistant Examiner — Dion Ferguson
(74) *Attorney, Agent, or Firm* — R'Sue Popowich Caron

(57) ABSTRACT

An electrode for a supercapacitor includes a block copolymer and active material particles. The block copolymer is used both to bind the particles together and to act as an electrolyte. The electrode does not have a porous structure, but rather it is pressed or rolled to achieve zero porosity and to ensure good contact between the particles and the block copolymer electrolyte. Thus, the entire surface of the active particles can be accessed for charge storage. Furthermore, the volume of such an electrode is smaller than typical electrodes with the same capacity, as none of the volume is wasted with additional, non-active binder material, offering a higher effective active material loading per unit volume. Electrodes made in this way, with block copolymer electrolyte and active materials, can also form free-standing films that are easy to handle during manufacture of supercapacitors.

38 Claims, 5 Drawing Sheets

US 8,593,788 B2

SUPERCAPACITORS WITH BLOCK COPOLYMER ELECTROLYTES

This application claims priority to U.S. Provisional Patent Application No. 61/058,889, filed Jun. 4, 2008, and to International Patent Application Number PCT/US2009/045748, filed May 29, 2009, both of which are incorporated by reference herein.

BACKGROUND OF THE INVENTION

Field of the Invention

This invention relates generally to energy storage devices, and, more specifically, to supercapacitors that use high-dielectric, ionically conductive block copolymer electrolyte materials to bind together and to provide ionically conductive pathways for active particles in the electrodes.

Capacitors are storage devices that store electrical energy on an electrode surface. Unlike traditional capacitors consisting of plates separated by dielectric material, supercapacitors, sometimes referred to as ultracapacitors, electrochemical capacitors or double layer capacitors, are electrochemical cells that create and store energy by microscopic charge separation at an electrical chemical interface between electrode and electrolyte. The electrode is characterized by a fine microporous active material that has a high surface area. The pores are filled with electrolyte in order to gain access to a large portion of the available surface area of the active material. Supercapacitors store more energy than traditional capacitors and discharge this energy at higher rates than rechargeable batteries. In addition, the cycle life of electrochemical capacitors is on the order of $10^5$ to $10^6$ cycles, far exceeding that of battery systems (~800-1000 cycles). These advantages are achievable because neither rate-determining nor life-limiting phase transformations take place at the electrode/electrolyte interface.

Ultracapacitors are attractive for potential applications in emerging technology areas that require electric power in the form of short bursts. Examples of such applications include digital communication devices that require power pulses in the millisecond range and traction power systems in electric vehicles where high power demand can last for seconds up to minutes.

Supercapacitors have two porous electrodes that are isolated from electrical contact with each other by an electronically insulating electrolyte. The electrolyte can be a solid or gel polymer electrolyte or a porous separator impregnated with an electrolytic solution. Each electrode is in electrical contact with a current collector.

When an electric potential is applied to a supercapacitor cell, anions flow to the positive electrode and cations flow to the negative electrode under the influence of the electric field generated between the electrodes. In the absence of any electrochemical reaction, this leads to the creation of diffused, electrically charged layers, also known as electrical double layers, very close to the electrodes. Electroneutrality is not obeyed in this layer. The depth of the electrical double layer depends on the applied potential.

During discharge, the electrode potential or voltage across the supercapacitor electrodes causes ionic current to flow as the charges in the electrical double layer move spontaneously to achieve electroneutrality, while an electronic current flows through an external circuit between electrode current collectors. The external circuit can include a load, and the electronic circuit can supply power to the load. The load can be, for example, a portable radio, an electric motor, a light emitting diode or another electrical device.

The supercapacitor is not a primary cell, but it can be recharged. The process of charging and discharging can be repeated over and over. For example, after discharging a supercapacitor by powering an electrical device, the supercapacitor can be recharged by supplying potential to the connectors. When a capacitor is combined with a battery, the capacitor can handle the peak power, and the battery can provide power for a sustained load between peaks. Such a hybrid power system can improve overall power performance and extend battery cycle life.

A major advantage of a supercapacitor is that it can deliver electrical energy at high power. A high power operation is predicated upon a low internal resistance. Hence, it is useful for supercapacitor electrolytes to have minimal resistance to ion movement and to provide an electronic conduction barrier between the two electrodes.

Various materials have been used as separators in supercapacitors, including (1) aquagel and resorcinol formaldehyde polymer, (2) polyolefin film, (3) non-woven polystyrene cloth, (4) acrylic resin fibers and (5) non-woven polyester film. Other materials such as porous polyvinyl chloride, porous polycarbonate membrane, and fiberglass paper have also been used as separators for ultracapacitors.

It is difficult to remove all impurities from liquid electrolytes. When a supercapacitor that has a liquid electrolyte with impurities is cycled again and again, the impurities cause side reactions to occur, which can lead to leakage current which can limit the lifetime of the supercapacitor substantially. It is relatively simple to make polymers that are extremely pure, and many polymers are inherently stable against electrochemical degradation. Thus, polymer electrolytes provide a big advantage over liquid electrolytes and can be used to make supercapacitors that have very long working lives.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

The preferred embodiments are illustrated in the context of electrolytes for supercapacitors. The skilled artisan will readily appreciate, however, that the materials and methods disclosed herein will have application in a number of other contexts where charge separation is desirable, particularly where ionic conduction is important.

Reference will now be made to the drawings wherein like numerals refer to like parts throughout.

Ultracapacitors store energy by two processes. The first is the separation of positive and negative charges at the interface between the electrode and the electrolyte. This phenomenon is called double layer capacitance. The electrical double layer is present at virtually all interfaces between electrodes and electrolytes and is a fundamental property of electrochemical systems. The double layer consists of solvated ions as well as sorbed ions that are specifically sorbed onto the electrode from solution. The distance between the electrode and the solvated ions is limited by the presence of a solvation sheath around the ions. Thus the solvated ions cannot sorb directly onto the electrode and can approach only as close as the solvation sheath allows, i.e., to some distance d from the electrode. Therefore, in the case of these solvated ions, there exist positive and negative charges separated by a distance d, which produce a true capacitance in the electrical sense.

The second charge storage mechanism is the sorption of ions onto the surface of the electrode. This phenomenon is called pseudocapacitance. Pseudocapacitance is not an electrostatic capacitance like that of the double layer or as occurs in a parallel plate capacitor. Instead, pseudocapacitance is merely a convenient formalism used to express the phenomenon of ion adsorption onto electrodes. The physical processes involved in energy storage in an ultracapacitor are distinctly different from the electrochemical oxidation reduction processes responsible for charge storage in batteries. Hence, these devices represent a class of energy storage materials completely separate from batteries.

Figure 1:
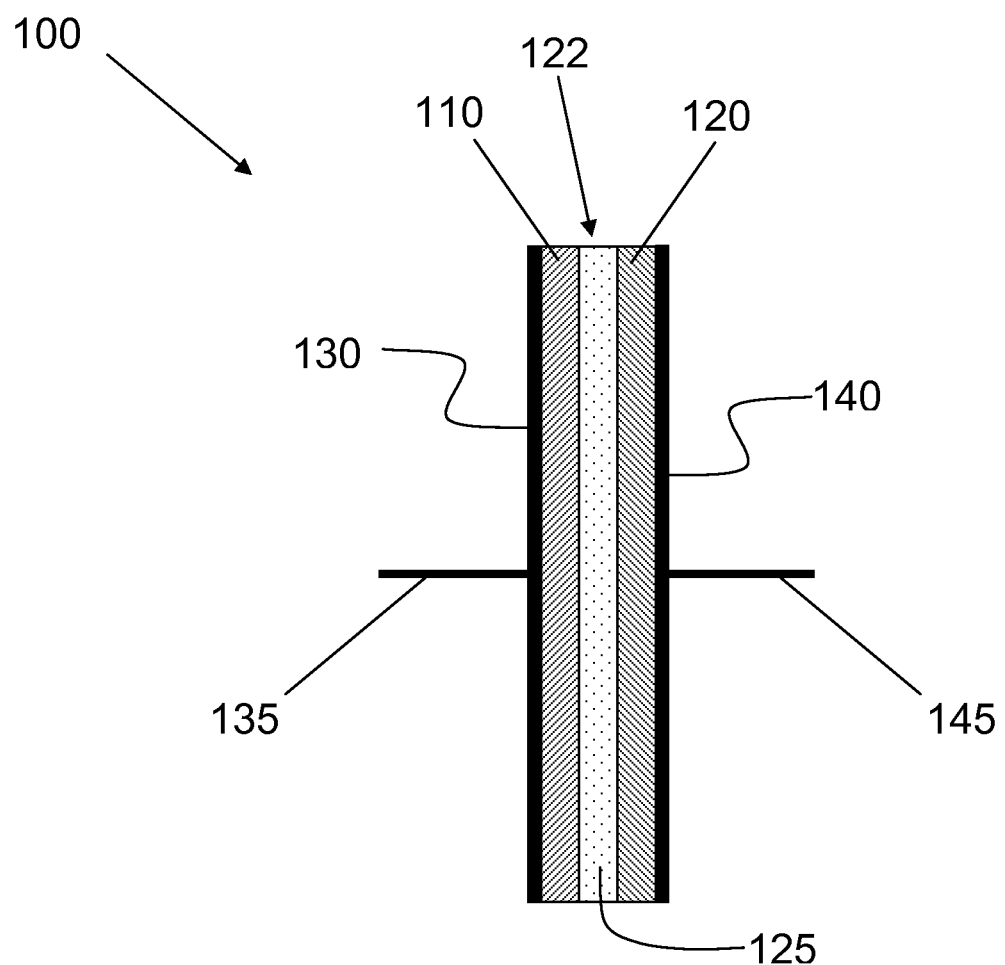
FIG. 1 is a schematic cross-section drawing that shows the main components of a typical supercapacitor cell.

FIG. 1 is a schematic cross-section drawing that shows the main components of a supercapacitor cell 100. There are two electrodes 110, 120 separated by a region 122. The region 122 contains an inert separator (not shown) that can soak up liquid electrolyte 125 and keep a supply of the electrolyte 125 within the region 122 and in contact with the electrodes 110, 120. For a symmetric supercapacitor, the electrodes 110, 120 are the same. For an asymmetric supercapacitor, the electrodes 110, 120 are different. Typical electrodes for supercapacitors are made of small particles of active material which are held together by a binder material to make a porous structure. Liquid electrolyte fills the pores in the electrode to provide a path by which ions can sorb onto the surface of the active material particles. The binder material serves a useful purpose in holding the active particles in a porous structure to allow space for the liquid electrolyte, but, in attaching to the active particles, the binder also limits the ion transport to a portion of the active material surfaces. The pore structure must have channels large enough to allow the liquid electrolyte to penetrate into all regions of the electrode. In many cases, a non-aqueous solvent mixed with a salt is used as the liquid electrolyte. Exemplary solvents include, but are not limited to ethyl carbonate (EC), methylethyl carbonate (MEC), methylpropyl carbonate (MPC) and mixtures thereof. Other exemplary solvents include tetra(ethylene glycol)dimethyl ether (TEGDME), TEGDME/1,3-dioxolane (DIOX) (1:1, v/v) and 1,2-dimethoxyethane (DME)/di(ethylene glycol)dimethyl ether (DEGDME) (1:1, v/v).

Adjacent the electrodes 110, 120 are current collectors 130, 140, which are attached to electrical leads 135, 145, respectively. The leads 135, 145 are connected to an external circuit through which the supercapacitor 100 is charged and discharged. In addition to transferring charges from the electrodes 110, 120 to the electrical leads 135, 145 the current collectors 130, 140 also prevent the liquid electrolyte 125 from leaking out of the porous electrodes.

In one embodiment of the invention, a block copolymer is used in an electrode for a supercapacitor both to bind the active material particles together and as an electrolyte. The electrode is non-porous; it is pressed or rolled to achieve zero porosity and ensure good contact between the particles and the block copolymer electrolyte. Thus, the entire surface of the active particles can be accessed for charge storage. Furthermore, the volume of such an electrode is smaller than typical electrodes with the same capacity, as none of the volume is wasted with additional, non-active binder material, offering a higher effective active material loading per unit volume. Electrodes made in this way, with block copolymer electrolyte and active materials, can also form free-standing films that are easy to handle during manufacture.

Figure 2:
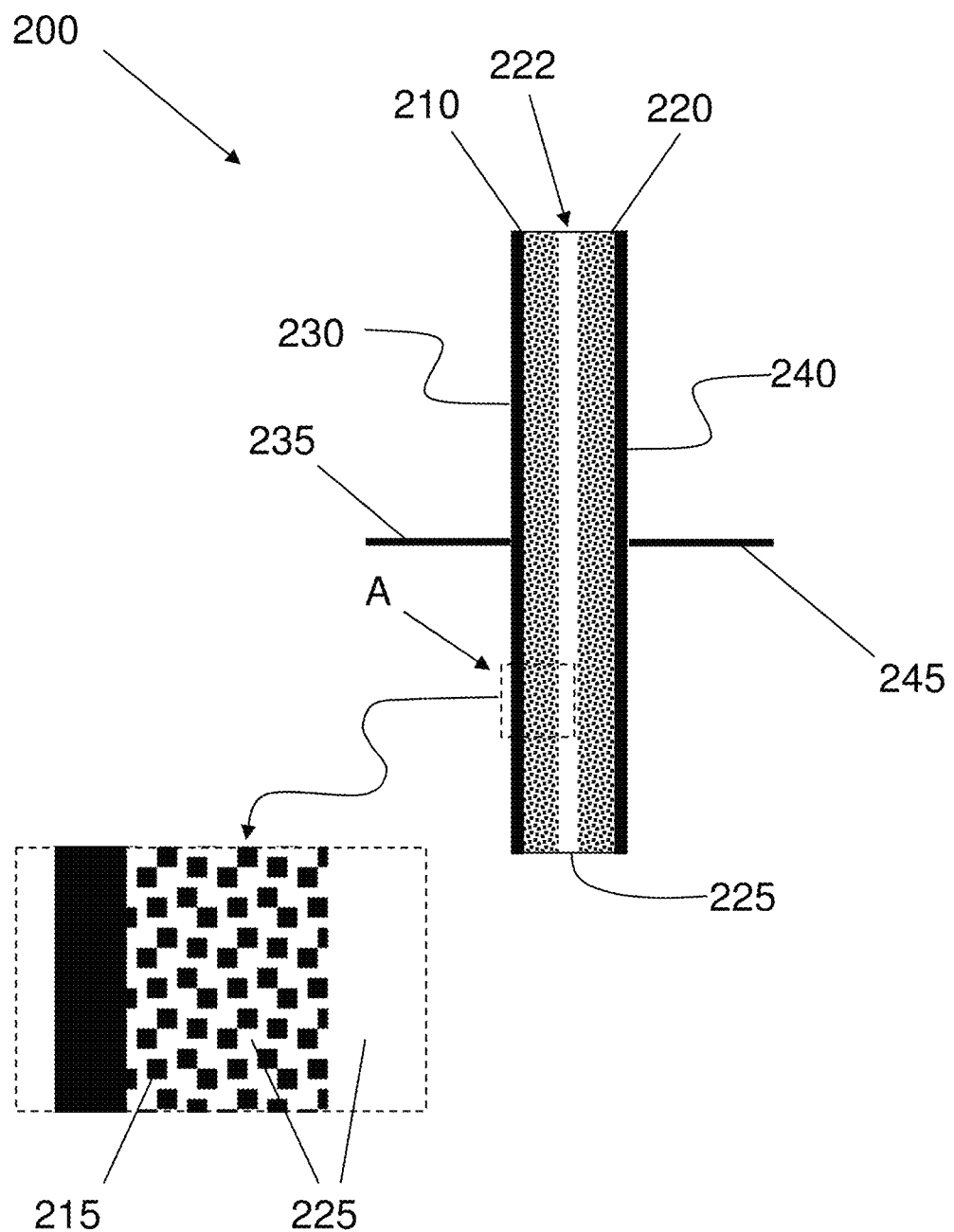
FIG. 2 is a schematic cross-section drawing that shows the main components of a supercapacitor cell, according to an embodiment of the invention.

An exemplary supercapacitor cell 200, according to an embodiment of the invention, is shown in a schematic cross-section drawing in FIG. 2. There are two electrodes 210, 220 that are made of active material particles and block copolymer electrolyte. The region 222 between the electrodes also contains a block copolymer electrolyte 225. The inset is a magnified view of a region A of the supercapacitor cell 200 as indicated by the dashed rectangle. The inset shows active material particles 215 distributed throughout the block copolymer electrolyte 225 in the electrode 210. The block copolymer electrolyte is similarly distributed among the active material particles in the electrode 220. The active material particles 215 are not limited to the shape and distribution shown, but can have any shape or distribution as desired.

FIG. 2 shows an arrangement wherein the same block copolymer electrolyte 225 is used in both electrodes 210, 220 as well as the region 222 between the electrodes. In another arrangement (not shown), one block copolymer electrolyte is used in the electrodes 210, 220 and a different, compatible block copolymer electrolyte or other kind of compatible electrolyte is used in the region 222 between the electrodes. In yet another arrangement (not shown), one block copolymer electrolyte is used in the electrode 210, another block copolymer electrolyte is used in the electrode 220, and a different, compatible block copolymer electrolyte or other kind of compatible electrolyte is used in the region 222 between the electrodes.

The active material particles 215 in the electrode 210 can be made of any material that is known to be useful in supercapacitor electrodes, such as materials with high charge capacity. It is useful to use very small particles, e.g., on the order of 5-500 nm in size, to ensure high surface area of the active material. Examples of such materials include, but are not limited to oxides, chlorides, bromides, sulfates, nitrates, sulfides, hydrides, nitrides, phosphides, or selenides of lithium, ruthenium, tantalum, rhodium, iridium, cobalt, nickel, molybdenum, tungsten or vanadium coated onto porous carbon particles, or combinations thereof. In one arrangement, the active material is platinum.

In one arrangement, nanostructures are used as the active material particles 215. The nanostructures can be approximately equiaxed (e.g., nanocrystals, nanoparticles) or can have a linear or branched structure (e.g., nanowires, nanorods). The nanostructures can be made from any convenient electrically conductive material (e.g., semiconducting material, ferroelectric material, metal, ceramic, polymer, etc.) and can be made of a single material or can be heterostructures. For example, the nanostructures can be made of a semiconducting material, such as a material that has a first element selected from group 2 or from group 12 of the periodic table and a second element selected from group 16 (e.g., ZnS, ZnO, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, and like materials); a material that has a first element selected from group 13 and a second element selected from group 15 (e.g., GaN, GaP, GaAs, GaSb, InN, InP, InAs, InSb, and like materials); a material made of a group 14 element (Ge, Si, and like materials); a material such as PbS, PbSe, PbTe, AlS, AlP, and AlSb; or an alloy or a mixture thereof.

FIG. 2 shows the supercapacitor 200 with a first current collector 230 in electrical communication with the electrode 210 and a second current collector 240 in electrical communication with the electrode 220. The current collectors 230, 240 can be made of any material that has good electron conduction properties, such as a metal. The current collectors 230, 240 can be continuous films or reticulated films, such as films with a net, mesh or perforated configuration. If the electronic conductivity of the electrodes 210, 220 themselves is good enough, the current collectors 230, 240 may be omitted, and the electrodes 210, 220 act as their own current collectors. In one arrangement, both current collectors 230, 240 are used. In another arrangement, only one current collector 230 or 240 is used. In yet another arrangement, no current collector is used. The block copolymer electrolyte in the electrodes is solid, unlike for supercapacitors that use liquid electrolytes. Thus there is no danger of electrolyte leakage even when no current collector is used. The leads 235, 245 connect the current collectors 230, 240 to an external circuit through which the supercapacitor 200 can be charged and discharged. When the electrode 210, 220 acts as its own current collector, the lead 235, 245 is connected directly to the electrode 210, 220, respectively.

The block copolymers have both an ionically conductive component and a thermo-mechanically stable component. Thus they are designed to have high ion conductivity, high dielectric constant, high dielectric strength, and toughness. In one arrangement, the block copolymer contains polystyrene and a polyether and has an ionic conductivity between about $10^{-5}$ S/cm and $10^{-3}$ S/cm at 25° C. The dielectric constant of the conducting block is in the range of about 5 to 50. Such a combination of high dielectric constant and high dielectric strength makes it possible to design a supercapacitor with a very thin electrolyte layer between the electrodes. In one embodiment of the invention, the electrolyte layer is between about 10 nm and 10 μm thick. In another embodiment of the invention, the electrolyte layer is between about 10 nm and 1 μm thick. In yet another embodiment of the invention, the electrolyte layer is between about 10 nm and 100 nm thick. It is easy to make such thin layers, especially by methods such as spin casting or powder deposition.

It is a tremendous advantage for a supercapacitor to have such a thin electrolyte layer, as more charge can be stored in less space than for a supercapacitor with a thick electrolyte layer. The smaller amount of electrolyte material also reduces the cost of fabrication. Furthermore, such very thin supercapacitor trilayer assemblies, i.e., electrode/electrolyte/electrode assemblies, are very flexible and can be wrapped up in a jelly-roll configuration or can conform to any form factor as desired. Being able to tolerate very thin electrolyte layers between electrodes is one of many advantages of the supercapacitor described herein. For any supercapacitor, there is a voltage at which electrochemical stability is lost, and side reactions can occur. Such reactions mark the end of the useful life of a supercapacitor. Yet the block copolymer electrolyte described herein offers excellent electrochemical stability; it has very high dielectric breakdown strength and thus can continue operating even when the electrolyte layer is very thin and the electric field is very high.

In one embodiment of the invention, the supercapacitor can operate between about 0 and 4.5 volts, for example, in the case of siloxane-containing copolymer electrolytes. In another embodiment of the invention, the supercapacitor can operate between about 0 and 3.8 volts. As is well known in the art of supercapacitors, the voltage range is determined by the electrochemical stability of the electrolyte with respect to the electrode/active material surface up to the oxidation or reduction of the copolymer electrolyte. Depending on the voltage requirements for the capacitor application, the electrolyte can be chosen from a group of copolymers for particular combinations of ionic conductivity and electrochemical stability. In one example, polyether-containing copolymers are used for the electrolyte. In another example, polysiloxane-containing copolymers are used for the electrolyte.

Nanostructured Block Copolymer Electrolytes

As described in detail above, a block copolymer electrolyte can be used in the embodiments of the invention.

Figure 3A:
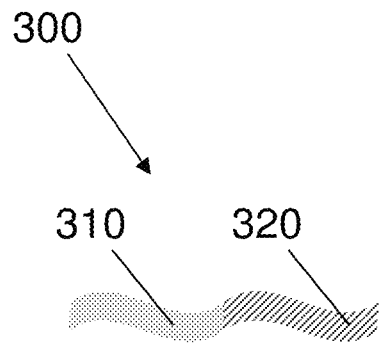
FIG. 3 is a schematic drawing of a diblock polymer and a domain structure it can form, according to an embodiment of the invention.

FIG. 3A is a simplified illustration of an exemplary diblock polymer molecule 300 that has a first polymer block 310 and a second polymer block 320 covalently bonded together. In one arrangement both the first polymer block 310 and the second polymer block 320 are linear polymer blocks. In another arrangement, either one or both polymer blocks 310, 320 has a comb structure. In one arrangement, neither polymer block is cross-linked. In another arrangement, one polymer block is cross-linked. In yet another arrangement, both polymer blocks are cross-linked.

Figure 3B:
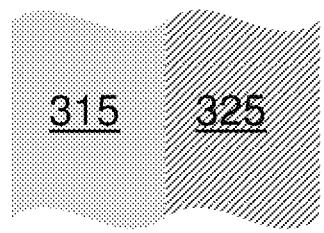
Figure 3C:
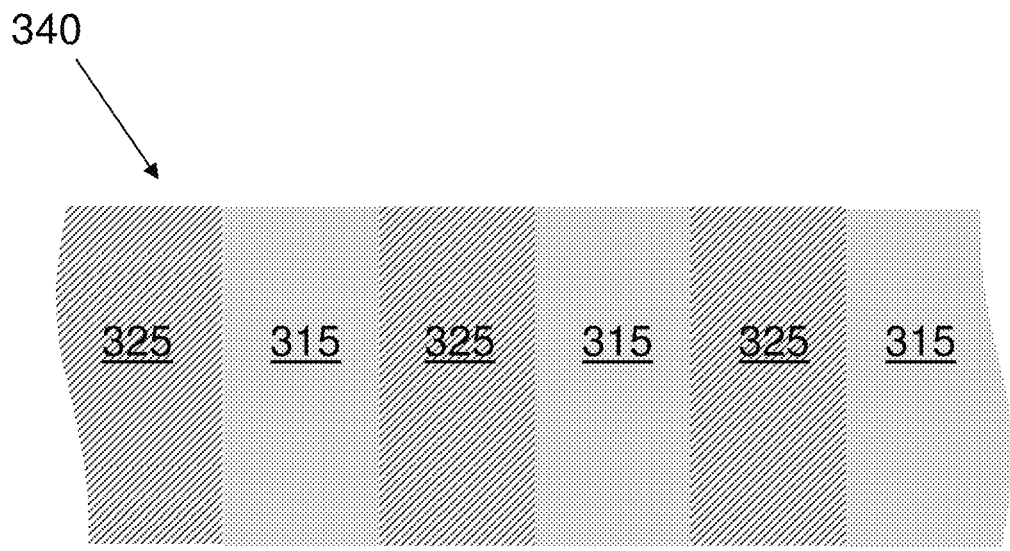

Multiple diblock polymer molecules 300 can arrange themselves to form a first domain 315 of a first phase made of the first polymer blocks 310 and a second domain 325 of a second phase made of the second polymer blocks 320, as shown in FIG. 3B. Diblock polymer molecules 300 can arrange themselves to form multiple repeat domains, thereby forming a continuous nanostructured block copolymer material 340, as shown in FIG. 3C. The sizes or widths of the domains can be adjusted by adjusting the molecular weights of each of the polymer blocks.

In one arrangement the first polymer domain 315 is ionically conductive, and the second polymer domain 325 provides mechanical strength to the nanostructured block copolymer.

Figure 4A:
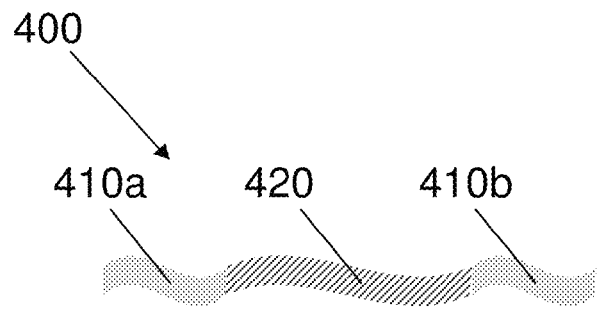
FIG. 4 is a schematic drawing of a triblock polymer and a domain structure it can form, according to an embodiment of the invention.

FIG. 4A is a simplified illustration of an exemplary triblock polymer molecule 400 that has a first polymer block 410a, a second polymer block 420, and a third polymer block 410b that is the same as the first polymer block 410a, all covalently bonded together. In one arrangement the first polymer block 410a, the second polymer block 420, and the third copolymer block 410b are linear polymer blocks. In another arrangement, either some or all polymer blocks 410a, 420, 410b have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 4B:
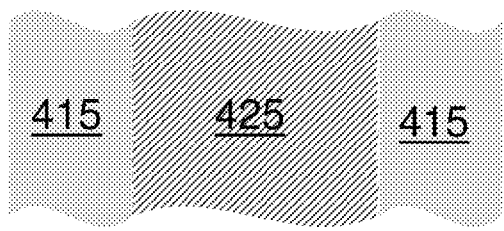
Figure 4C:
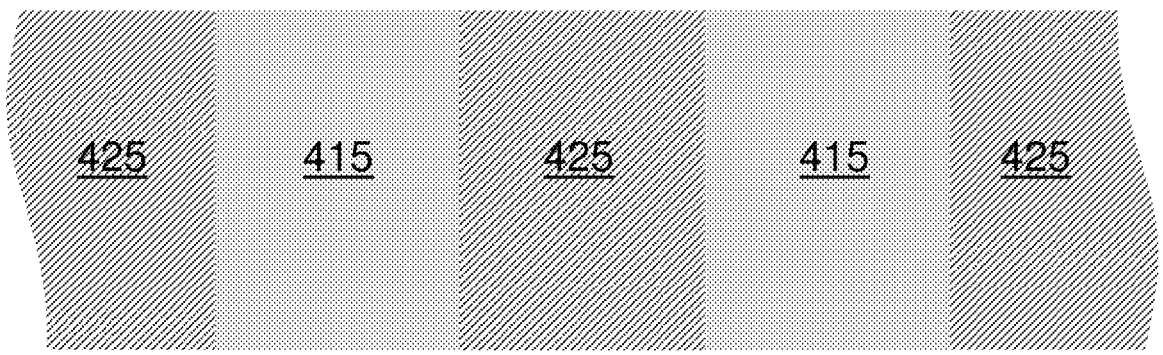

Multiple triblock polymer molecules 400 can arrange themselves to form a first domain 415 of a first phase made of the first polymer blocks 410a, a second domain 425 of a second phase made of the second polymer blocks 420, and a third domain 415b of a first phase made of the third polymer blocks 410b as shown in FIG. 4B. Triblock polymer molecules 400 can arrange themselves to form multiple repeat domains 425, 415 (containing both 415a and 415b), thereby forming a continuous nanostructured block copolymer 430, as shown in FIG. 4C. The sizes of the domains can be adjusted by adjusting the molecular weights of each of the polymer blocks.

In one arrangement the first and third polymer domains 415a, 415b are ionically conductive, and the second polymer domain 425 provides mechanical strength to the nanostructured block copolymer. In another arrangement, the second polymer domain 425 is ionically conductive, and the first and third polymer domains 415 provide a structural framework.

Figure 5A:
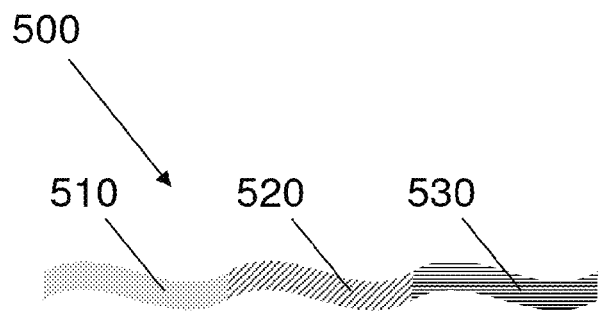
FIG. 5 is a schematic drawing of a triblock polymer and a domain structure it can form, according to another embodiment of the invention.

FIG. 5A is a simplified illustration of another exemplary triblock polymer molecule 500 that has a first polymer block 510, a second polymer block 520, and a third polymer block 530, different from either of the other two polymer blocks, all covalently bonded together. In one arrangement the first polymer block 510, the second polymer block 520, and the third copolymer block 530 are linear polymer blocks. In another arrangement, either some or all polymer blocks 510, 520, 530 have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 5B:
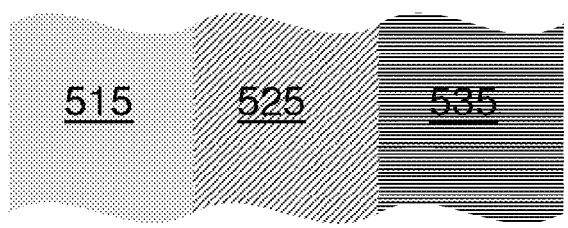
Figure 5C:
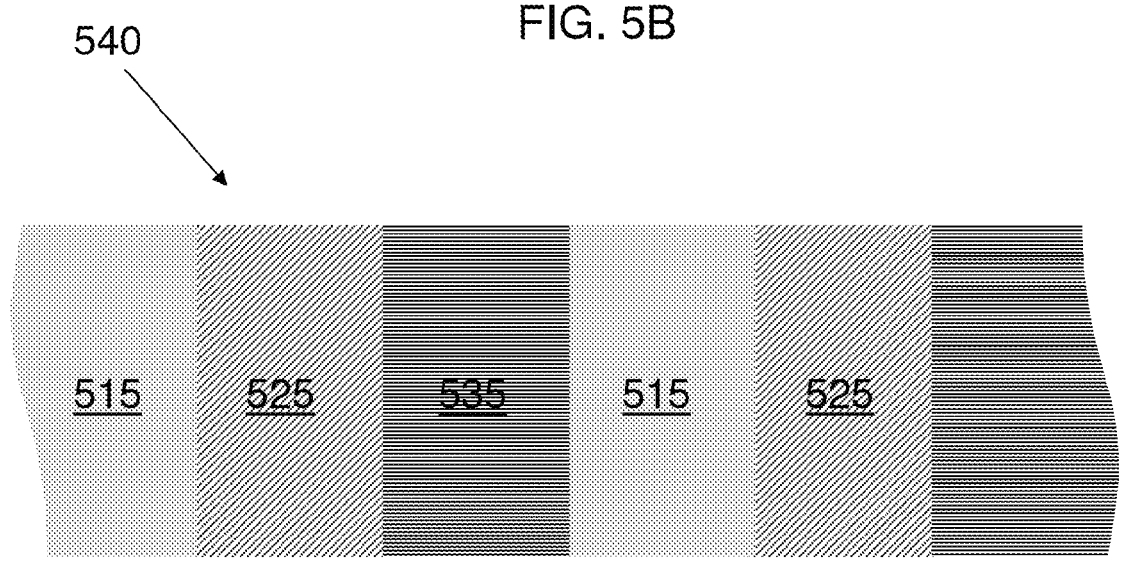

Multiple triblock polymer molecules 500 can arrange themselves to form a first domain 515 of a first phase made of the first polymer blocks 510a, a second domain 525 of a second phase made of the second polymer blocks 520, and a third domain 535 of a third phase made of the third polymer blocks 530 as shown in FIG. 5B. Triblock polymer molecules 500 can arrange themselves to form multiple repeat domains, thereby forming a continuous nanostructured block copolymer 540, as shown in FIG. 5C. The sizes of the domains can be adjusted by adjusting the molecular weights of each of the polymer blocks.

In one arrangement the first polymer domains 515 are ionically conductive, and the second polymer domains 525 provide mechanical strength to the nanostructured block copolymer. The third polymer domains 535 provides an additional functionality that may improve mechanical strength, ionic conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment, the structural material has a modulus in excess of $1\times10^5$ Pa at electrochemical cell operating temperatures. In one embodiment, the third polymer (1) is rubbery; and (2) has a glass transition temperature lower than operating and processing temperatures. It is useful if all materials are mutually immiscible.

In one embodiment of the invention, the conductive phase can be made of a linear polymer. Conductive linear polymers that can be used in the conductive phase include, but are not limited to, polyethers, polyamines, polyimides, polyamides, alkyl carbonates, polynitriles, and combinations thereof. The conductive linear polymers can also be used in combination with polysiloxanes, polyphosphazines, polyolefins, and/or polydienes to form the conductive phase.

In another exemplary embodiment, the conductive phase is made of comb polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

Further details about polymers that can be used in the conductive phase can be found in International Application Number PCT/US09/45356, filed May 27, 2009, U.S. Provisional Patent Application No. 61/091,626, filed Aug. 25, 2008, U.S. Provisional Patent Application No. 61/145,518 filed Jan. 16, 2009, U.S. Provisional Patent Application No. 61/145,507, filed Jan. 16, 2009, U.S. Provisional Patent Application No. 61/158,257 filed Mar. 6, 2009, and U.S. Provisional Patent Application No. 61/158,241, filed Mar. 6, 2009, all of which are included by reference herein.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $B_{12}F_xH_{12-x}$, $B_{12}F_{12}$, and mixtures thereof.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural phase can be made of polymers such as polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, such as polyvinylidene fluoride, or copolymers that contain styrene, methacrylate, or vinylpyridine.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

Further details about block copolymer electrolytes are described in U.S. patent application Ser. No. 12/225,934, filed Oct. 1, 2008, U.S. patent application Ser. No. 12/271, 1828, filed Nov. 14, 2008, and PCT Patent Application Number PCT/US09/31356, filed Jan. 16, 2009, all of which are included by reference herein.

In one example, the block copolymer electrolyte can be made to be fail-safe. Polymers that undergo a particular order/disorder transition upon heating can be used. If the supercapacitor heats up, the polymer electrolyte becomes disordered and becomes an insulator for ionic charge transport. Thus charges can no longer move in the supercapacitor, and heating stops. An example of a block copolymer that can undergo such a transition is a PI-PEO diblock copolymer at 175° C.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

I claim:

1. A supercapacitor assembly comprising a first non-porous electrode comprising first electrode active particles bound together by a first block copolymer electrolyte that contains a first salt, the first electrode having a first interior surface and a first exterior surface,
   a second non-porous electrode comprising second electrode active particles bound together by a second block copolymer electrolyte that contains a second salt, the second electrode having a second interior surface and a second exterior surface, and
   a electrolyte layer between the first electrode and the second electrode, adjacent the first interior surface and the second interior surface; wherein the electrolyte layer comprises a third block copolymer electrolyte that contains a third salt, different from the first salt.

2. The assembly of claim 1 wherein the electrolyte layer comprises a liquid electrolyte.

3. The assembly of claim 1 wherein the first electrode and the second electrode comprise free-standing films.

4. The assembly of claim 1 wherein the first electrode active particles and the second electrode active particles comprise electrically conductive nanostructures.

5. The assembly of claim 4 wherein the first electrode active particles and the second electrode active particles are the same.

6. The assembly of claim 1 wherein the first electrode active particles and the second electrode active particles each are selected independently from the group consisting of carbon, oxides, chlorides, bromides, sulfates, nitrates, sulfides, hydrides, nitrides, phosphides, or selenides of lithium, ruthenium, tantalum, rhodium, iridium, cobalt, nickel, molybdenum, tungsten or vanadium coated onto porous carbon particles, or combinations thereof.

7. The assembly of claim 1, wherein the first salt, the second salt, and the third salt are each independently selected from the group consisting of chlorides, bromides, sulfates, nitrates, sulfides, hydrides, nitrides, phosphides, or selenides of lithium, sodium, potassium, silver, barium, lead, calcium, ruthenium, tantalum, rhodium, indium, cobalt, nickel, molybdenum, tungsten or vanadium.

8. The assembly of claim 7 wherein the lithium salt is selected from the group consisting of LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, lithium oxalatoborate, as well as other lithium bis (chelato)borates having five to seven membered rings, $LiPF_3(C_2F_5)_3$, $LiPF_3(CF_3)_3$, $LiB(C_2O_4)_2$, and mixtures thereof.

9. The assembly of claim 7 wherein the salt is selected from the group consisting of $AgSO_3CF_3$, NaSCN, $NaSO_3CF_3$, KTFSI, NaTFSI, $Ba(TFSI)_2$, $Pb(TFSI)_2$, and $Ca(TFSI)_2$.

10. The assembly of claim 1, wherein the first salt and the second salt are lithium salts.

11. The assembly of claim 1 wherein the first block copolymer electrolyte and the second block copolymer electrolyte each independently further comprises a single ion conductor.

12. The assembly of claim 1, wherein the block copolymers are either diblock copolymers or triblock copolymers.

13. The assembly of claim 12 wherein the first block of the first block copolymer, the first block of the second block copolymer, and the first block of the third block copolymer each is selected independently from the group consisting of polyethers, polyamines, polyimides, polyamides, alkyl carbonates, polynitriles, polysiloxanes, polyphosphazines, polyolefins, polydienes, ionically-conductive comb polymer wherein the comb polymer comprises a backbone and pendant groups, and combinations thereof.

14. The assembly of claim 13 wherein the first block of the first block copolymer, the first block of the second block copolymer, and the first block of the third block copolymer each independently further comprises at least one alkali metal salt.

15. The assembly of claim 13 wherein the first block of the first block copolymer, the first block of the second block copolymer, and the first block of the third block copolymer each independently further comprises a single ion conductor.

16. The assembly of claim 15 wherein the single ion conductors are selected from the group consisting of sulfonamide salts, boron based salts, and sulfates groups.

17. The assembly of claim 13 wherein the backbone comprises one or more selected from the group consisting of polysiloxanes, polyphosphazines, polyethers, polydienes, polyolefins, polyacrylates, polymethacrylates, and combinations thereof.

18. The assembly of claim 13 wherein the pendants comprise one or more selected from the group consisting of oligoethers, substituted oligoethers, nitrile groups, sulfones, thiols, polyethers, polyamines, polyimides, polyamides, alkyl carbonates, polynitriles, other polar groups, and combinations thereof.

19. The assembly of claim 12 wherein the second block of the first block copolymer, the second block of the second block copolymer, and the second block of the third block copolymer each is selected independently from the group consisting of polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, polyvinylidene fluoride, and copolymers that contain styrene, methacrylate, and/or vinylpyridine.

20. The assembly of claim 1 wherein the first block copolymer electrolyte and the second block copolymer electrolyte comprise the same block copolymer.

21. The assembly of claim 1, wherein the first block copolymer, the second block copolymer, and the third block copolymer comprise the same block copolymer.

22. The assembly of claim 1 wherein the electrolyte layer is between about 10 nm and 10 µm thick.

23. The assembly of claim 1 wherein the electrolyte layer is between about 10 nm and 1 µm thick.

24. The assembly of claim 1 wherein the electrolyte layer is between about 10 nm and 100 nm thick.

25. The assembly of claim 1 wherein the first electrode and the second electrode also act as current collectors for the supercapacitor.

26. The assembly of claim 1, further comprising a first current collector adjacent the exterior surface of the first electrode.

27. The assembly of claim 26, further comprising a second current collector adjacent the exterior surface of the second electrode.

28. The assembly of claim 27 wherein the first current collector and the second current collector are each selected independently from the group consisting of continuous metal layers and discontinuous metal layers.

29. The assembly of claim 1 wherein the supercapacitor can be operated between about 0 and 4.5 volts.

30. The assembly of claim 1 wherein the supercapacitor can be operated between about 0 and 3.8 volts.

31. The assembly of claim 1 wherein the supercapacitor can be operated between about 1.5 and 4.5 volts.

32. A supercapacitor assembly comprising two non-porous electrodes comprising electrode active particles bound together by a block copolymer electrolyte that contains a first salt, and a layer of the block copolymer electrolyte positioned between the two electrodes and m ionic communication with the two electrodes; wherein the layer of the block copolymer electrolyte contains a second salt different from the first salt.

33. The assembly of claim 32 wherein the two electrodes are free-standing.

34. The assembly of claim 32 wherein the block copolymer electrolyte is continuous throughout the assembly.

35. The assembly of claim 32 wherein the electrode active particles for each of the two non-porous electrodes are selected independently for each electrode from the group consisting of carbon, oxides, chlorides, bromides, sulfates, nitrates, sulfides, hydrides, nitrides, phosphides, or selenides of lithium, ruthenium, tantalum, rhodium, iridium, cobalt, nickel, molybdenum, tungsten or vanadium coated onto porous carbon particles, or combinations thereof.

36. The assembly of claim 32 wherein the block copolymer comprises a first polymer block that is ionically conductive and a second non-conductive block that has a high dielectric constant and that provides high dielectric strength and toughness to the block copolymer.

37. The assembly of claim 36 wherein the block copolymer further comprises at least one salt selected from the group consisting of chlorides, bromides, sulfates, nitrates, sulfides, hydrides, nitrides, phosphides, or selenides of lithium, sodium, potassium, silver, barium, lead, calcium, ruthenium, tantalum, rhodium, iridium, cobalt, nickel, molybdenum, tungsten or vanadium.

38. The assembly of claim 36 wherein the block copolymer further comprises a single ion conductor.

* * * * *